United States Patent
Postma et al.

[19]

[11] Patent Number: 6,022,178
[45] Date of Patent: Feb. 8, 2000

[54] FLEXURE WASHER BEARING AND METHOD

[75] Inventors: Robert W. Postma, Los Angeles; Robert B. Pan; Brian T. Hamada, both of Torrance; Louis K. Herman, Rancho Palos Verdes, all of Calif.

[73] Assignee: The Aerospace Corporation, El Segundo, Calif.

[21] Appl. No.: 09/119,510

[22] Filed: Jul. 20, 1998

[51] Int. Cl.[7] .................................................. F16B 43/00
[52] U.S. Cl. .......................... 411/534; 411/537; 411/547; 403/28
[58] Field of Search ........................... 411/531, 534–539, 411/545–547, 428; 403/28, 408.1; 52/167.5, 167.6, 783.17; 384/56, 36

[56] References Cited

U.S. PATENT DOCUMENTS

| | | | |
|---|---|---|---|
| 3,648,959 | 3/1972 | Wagner | 52/783.17 |
| 4,437,784 | 3/1984 | Peterson | 411/547 |
| 5,116,158 | 5/1992 | Carruthers | 403/28 |

FOREIGN PATENT DOCUMENTS

| | | | |
|---|---|---|---|
| 1160401 | 7/1958 | France | 411/531 |
| 234612 | 9/1989 | Japan | 411/531 |

*Primary Examiner*—Flemming Saether
*Attorney, Agent, or Firm*—Derrick Michael Reid

[57] ABSTRACT

A linear flexure washer bearing in a bolt interface assembly allows relative differential thermal expansion and contraction motion between a component plate and a base plate fastened together by a bolt without inducing large strains and stresses upon the bolt. The flexure washer bearing functions as a thin spacer between the component and base plates enabling high preload tightening of the bolted assembly while enabling relative bidirectional motion of the plates. The flexure washer is a multiple blade flexure assembly with thin flexure blades arranged unidirectionally between the top and bottom flexure plates. The elastic flexures bend to enable relative alternating unidirectional motion while the full strength of the bolt remains available to the support the component plate without creating high friction shear forces.

8 Claims, 3 Drawing Sheets

FLEXURE WASHER BEARING

FLEXURE WASHER BEARING

FLEXURE WASHER BEARING ASSEMBLY

FLEXURE WASHER BEARING ASSEMBLY WITH ROCKER WASHER

FLEXURE WASHER BEARING AND METHOD

REFERENCE TO RELATED APPLICATION

The present application is related to applicant's copending application entitled "Roller Washer Bearing and Method" Ser. No. 09/119,511, Jul. 20, 1998, by the same inventors.

STATEMENT OF GOVERNMENT INTEREST

The invention was made with Government support under contract F04701-93-C-0094 by the Department of the Air Force. The Government has certain rights in the invention. The invention described herein may be manufactured and used by and for the government of the United States for governmental purpose without payment of royalty therefor.

FIELD OF THE INVENTION

The invention relates to the field of mechanical washers and bearings and mechanical assemblies subjected to thermal expansion stresses and differential motion during temperature variations.

BACKGROUND OF THE INVENTION

Changes in temperature can cause excessive thermal stresses at the attachment points between arbitrary parallel plates of a mechanical assembly, such as a top component plate and a bottom base, both rigidly fastened together. An example of such a mechanical assembly is a high precision optical instrument assembly or inertial guidance unit on a spacecraft. The unit has an aluminum housing bolted to a graphite-epoxy honeycomb support base structure. The instrument and/or the support base are subjected to large changes in orbital temperature with resulting differential expansions between the base structure and the instrument. The top component plate and the bottom base plate could be fastened together using conventional fastening bolts, nuts and washers, through aligned holes extending through the component and base plate. The top component plate and the bottom base plate may have substantially different coefficients of thermal expansion. The resulting unequal amounts of expansion or contraction, if constrained, can cause significant locally induced strains and stresses. During temperature variations, the top component plate may expand and contract at a different rate than the bottom base plate, thereby tending to misalign the base holes and placing stresses upon the bolts extending through the fastening holes, leading to stress and even eventual failure of the bolt. The differential in the thermal expansion can also lead to damage to the component plate and base plate, or may result in misalignment of precision mounted instruments. These and other disadvantages are eliminated or reduced using the invention.

SUMMARY OF THE INVENTION

An object of the invention is to provide a linear flexure washer bearing which reduces stresses in an assembly having fastening bolts extending between a component plate and a base plate, both expanding and contracting at differing rates during temperature variations.

Another object of the invention is to provide a method of rigidly fastening the component and base plates together using a linear flexure washer bearing, thus enabling the component and base plates to expand and contract at differing rates during temperature variations without inducing excessive stresses in the component or base plate.

The present invention is a flexure washing bearing and method of use. The flexure bearing comprises a plurality of parallel flexures vertically extending between a top washer plate and a bottom washer plate. The flexures can flex and bend between the top and bottom washer plates in the presence of horizontal stresses upon the top washer plate relative to the bottom washer plate.

In one aspect of the invention, two flexure washer bearings are disposed in alignment around a bolt hole having a larger diameter than a fastening bolt extending through the bolt hole in the top component plate and into the bottom base plate into which is rigidly fastened the bolt. The bolt fastens together the top component plate, the bottom base plates and the two flexure washer bearings. In the preferred form, a bottom flexure bearing is disposed between the bottom base plate and the top component plate and another top flexure bearing is disposed between the bolt head the top component plate, with the bolt rigidly fastened into the bottom base plate. As the top component plate expands or contracts relative to the bottom base plate during temperature variations, the bottom washer plate of the bottom washer remains rigidly affixed to the bottom component plate and the top washer plate of the top washer bearing remains rigidly affixed to the bolt head, as the bottom washer plate of the top washer and the top washer plate of the bottom washer remain affixed to the top component plate, with the flexures of both bearings bending to enable the expansion and contraction of the top component plate relative to the base plate without placing stresses upon the bolt. As the top component plate expands or contracts, the flexures flex and bend so that the hole in the top component plate moves in misalignment relative to the hole in the bottom base plate. At all times, the bolt remains in a rigid vertical and orthogonal position relative to the horizontally extending assembly. The hole in the component plate being larger than bolt stem create sufficient space for the relative movement without the top component plate inducing stresses in the fastening bolt.

In another aspect of the invention, one flexure washer bearing is disposed between the top component plate and the bottom base plate with the top washer plate being rigidly fastened to the top component plate and with the bottom washer plate being rigidly fastened to the bottom base plate, again with an alignment hole larger than the diameter of the bolt stem around which is disposed a pair of rocker washers, one rocker washer disposed between the bolt head and the top component plate and the other rocker washer disposed between the bottom base plate and a bottom fastening nut. As the top component plate expands or contracts, the flexures flex and bend so that the hole in the top component plate moves in misalignment relative to the hole in the bottom base plate, causing the bolt to cock, that is, rotate within the alignment hole as the rocker washers rock upon the respective component and base plates. At all times, the bolt remains in a rigid position affixed to the bottom base plate. The hole in the component plate being larger than bolt stem create sufficient space for the relative rotation of the bolt stem within the alignment hole inducing stresses in the fastening bolt.

The invention releases interface stresses by allowing relative differential motion between the component plate and base plate fastened by a bolt. The full strength of the bolt is available to support the component plate. The strength of the bolted assembly is not compromised in the presence of relative thermal expansion and contraction. The elastic flexures within the flexure washer avoid friction shear forces. The flexure washer bearings function as a thin spacer between the component and base plates, thus enabling high preload tightening of the bolted assembly. These and other advantages will become more apparent from the following detailed description of the preferred embodiment.

DETAILED DESCRIPTION OF THE PREFERRED EMBODIMENT

Figure 1:
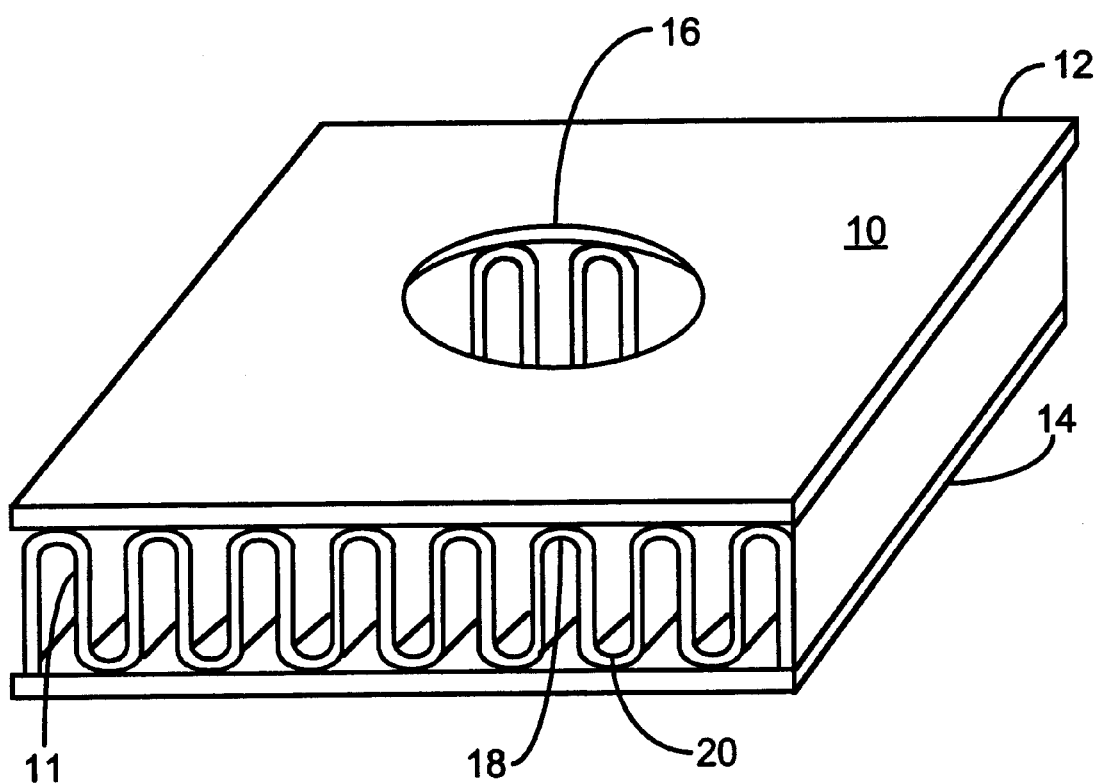
FIG. 1 is a drawing of a flexure washer bearing.

An embodiment of the invention is described with reference to the figures using reference designations as shown in the figures. Referring to FIG. 1, a flexure washer bearing 10 preferably comprises a plurality of elastic flexure blades 11, vertically and unidirectionally extending between a top washer plate 12 and a bottom washer plate 14. The flexure washer bearing 10 is preferably a multiple blade assembly including a parallel web of flexure blades 11, top plate 12 and bottom plate 14. A washer hole 16 is disposed preferably in the center of the flexure washer bearing. The flexure blades 11 can flex and bend so that the top washer plate 12 and bottom washer plate 14 can horizontally move back and forth small distances relative to each other in a direction orthogonal to the planes of the flexure blades 11. The flexure blades 11 can be machined from high strength metal alloys such as steel, beryllium copper and aluminum. The top plate 12 and bottom plate 14 may be bonded, brazed or welded to the flexure blades 11. The flexure blades 11 can also be made of corrugated stamped metal. As shown, the preferred stamped vertical flexure blades 11 are connected together by horizontal top portions 18 and horizontal bottom portions 20. As such, the top portions 18 form a top surface which may be used instead of the top plate 12, and the bottom portions 20 are a bottom surface which may be used instead of the bottom plate 14. As shown, the top and bottom portions 18 and 20 provide surfaces upon which the top and bottom plates 12 and 14 may be affixed. Hence, the top and bottom washer plates 12 and 14 are preferred optional surfaces to provide a top and bottom plate mounting surfaces. The top and bottom portions 18 and 20 may be substantially thicker than the flexing blades 11. The blades 11 should be thick enough to prevent collapse of the washer under expected loads and thin enough to flex sufficiently without incurring excessive stress. The flexure bearing 10 is shown generally in the shape of a square, but other shapes, such as a circle, could be used as well.

Figure 2:
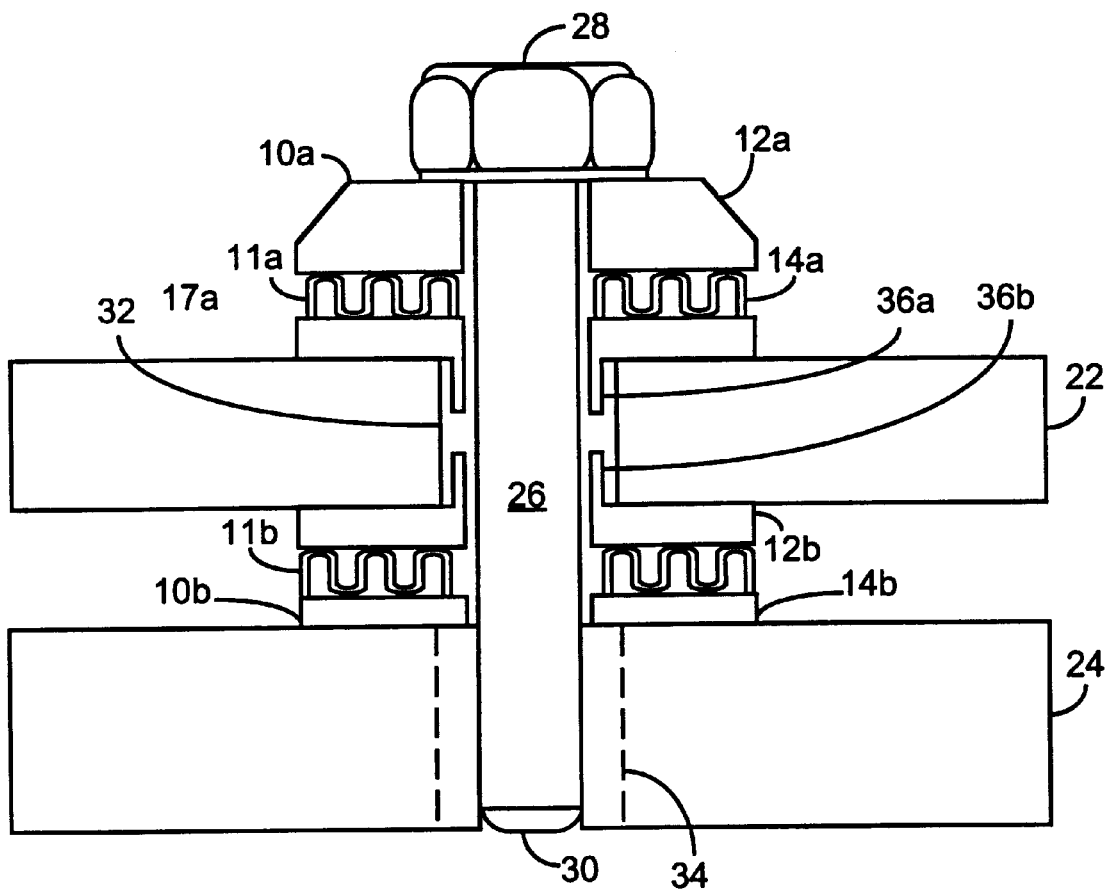
FIG. 2 is a drawing of a flexure washer bearing assembly.

Referring to FIGS. 1 and 2, and more particularly to FIG. 2, two flexure washer bearings 10a and 10b respectively comprise flexures blades 11a and 11b, top washer plates 12a and 12b, and bottom washer plates 14a and 14b, and are used to enable relative horizontal motion between a top component plate 22 and a bottom base plate 24. The flexure blades 11 are arranged and extend orthogonal to relative thermal expansion and contraction motion of the top component plate 22 relative to the bottom base plate 24. The flexure blades 11 constrain all other translatory motion of the component plate 22 relative to the base plate 24. A bolt 26 comprising a threaded stem 26 and bolt head 28 extends vertically through the plates 22 and 24, through a bore hole in the top component plate 22 and a threaded hole 34 in the bottom base plate 24. Here, the top plate 12a is shown to have a bevel edge for proper orientation of the washer, whereas the bottom plate 14b remains substantially flat for buttress against the base plate 24. The holes 32 and 34 are in initial alignment when the top and bottom plates 22 and 24 are initially fastened together. The base plate 24 could be a honeycomb structure having a low coefficient of thermal expansion whereas the component plate 22 may be an aluminum plate having a high thermal coefficient. The relative movement between the plates 22 and 34 may be, for example, between 0.002 and 0.004 inches over a typical temperature range.

The flexure washer bearings 10a and 10b further respectively comprise pilot registrations 36a and 36b for centering the bearings 10a and 10b into the hole 32. The registrations 36a and 36b are optional circular vertically extending flanges initially centered within bolt hole 32 to align the bearings 10a and 10b to the bolt hole 32. As shown, the hole 32 is larger than the diameter of the registrations 36a and 36b, and much larger than the diameter of the bolt stem 30, so that the top component plate 22 can move horizontally relative to the bottom base plate 24 while the bolt 36 remains in a vertical position while rigidly affixed to, preferably screwed into, the bottom base plate 24.

The two flexure washer bearings 10a and 10b are disposed in alignment around a bolt hole 32 having a larger diameter than the fastening bolt stem 30 extending through the bolt hole 32 in the top component plate 22 and into the bottom base plate 24 into which the bolt 26 is rigidly fastened. The bolt 28 fastens together the top component plate 22, the bottom base plate 24 and the two flexure washer bearings 10a and 10b. The bottom flexure bearing 10b is disposed between the bottom base plate 24 and the top component plate 22, and the top flexure bearing 10a is disposed between the bolt head 28 the top component plate 22. As the top component plate 22 expands or contracts back and forth in slight horizontal alternating unidirectional movement relative to the bottom base plate 24 during temperature variations, the bottom washer plate 14b of the bottom washer 10b remains rigidly affixed to the bottom component plate 24, and, the top washer plate 12a of the top washer bearing 10a remains rigidly affixed to the bolt head 28, as the bottom washer plate 14a of the top washer 10a and the top washer plate 12b of the bottom washer bearing 10b remain affixed to the top component plate 22, with the flexures 11a and 11b of both bearing 10a and 10b bending to enable the expansion and contraction differential motion of the top component plate 22 relative to the base plate 24 without placing stresses upon the bolt 26. As the top component plate 22 moves back and forth, the flexures 11a and 11b flex and bend so that the hole 32 in the top component plate 22 moves in misalignment relative to the thread hole 34 in the bottom base plate 24. At all times, the bolt 26 remains in a rigid vertical and orthogonal position relative to the horizontally extending plates 22 and 24. The hole 32 in the component plate 22 is larger than bolt stem 30 to create sufficient circumferential space around the stem 30 for the relative movement of the top component plate 22 without the top component plate 22 inducing stresses in by contact with the fastening bolt 26.

Figure 3:
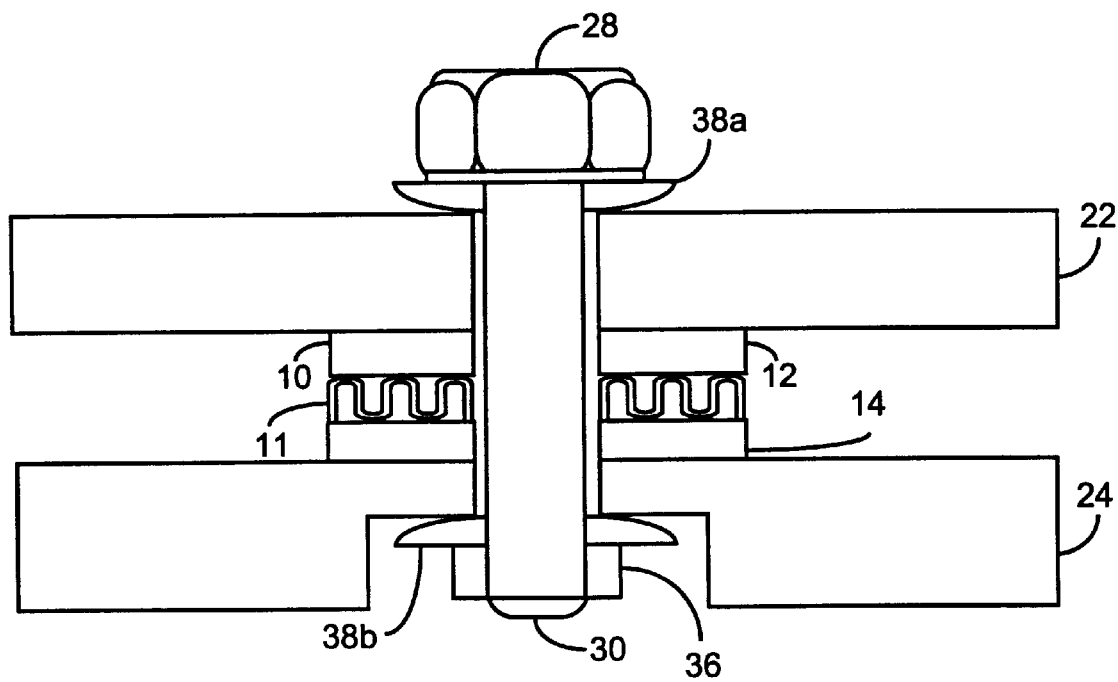
FIG. 3 is a drawing of a flexure washer bearing with rocker washers.

Referring to FIG. 3, a single flexure washer bearing 10, including the flexure blades 11, a top washer plate 12 and bottom washer plate 14 are disposed between the top component plate 22 and bottom base plate 24. The bolt 26 extends through the bolt hole 32 and is fastened using a nut 36. Two rocker washers 38a and 36b are disposed so as to juxtapose the bolt head 28 and nut 36 at the end of bolt stem 30. During relative horizontal movement of the top component plate 22 relative to the bottom base plate 24, the top washer plate 22 remains affixed to the bottom of the top component plate 22, the bottom washer plate 14 remain affixed to the top of the bottom base plate 24, the flexure blades 11 bend in relation to the relative movement, the bolt 26 rotates and is cocked to an angle relative to the bolt hole, and the rocker washers 38, having a curved cylindrical surface buttressing the plates 12 and 24, rotate as the bolt 26 rotates to its cocked position. During relative movement, the bolt 26 no longer remains in vertical upright position, but cocks back and forth, as the head 28 pivots on rocker washer 38a, as the end of the stem 30 pivots on rocker washer 38b, as the top component plate 22 moves back and forth, during temperature cycling.

In both assemblies of FIGS. 2 and 3, the flexure blades extend vertically and unidirectionally and bend orthogonally back and forth to this vertical orientation so as to enable relative horizontal movement along one direction, for example, a left to right orientation alternating unidirectional motion in the view of FIGS. 2 and 3, so as to resist movement in other than this left to right direction.

In many applications, such as with the use of large circular component and base plates, the expansion and contraction is radial relative to the centers of the circular component to a plurality of radially disposed mounting bolts 26. The flexure washer bearings 10 can be disposed to align the flexure bending of the flexure blades 11 to this radial relative movement, and as such, the blades 11 enable radial relative movement, while resisting circumferential relative movement between the component and base plates 22 and 24. Thus, the flexure washer bearings 10 provide a single degree of freedom of alternating unidirectional relative motion in the radial direction of the plates 22 and 24.

The circular pilot registrations 36 are used for centering the flexure washer bearing 10 around the bolt hole 32, but do not orient the washer bearing 10 in the direction of relative radial motion in the circular radial expansion and contraction application. Hence, the washer bearing could be easily modified to have radial orientation means, such as a pin and hole registration for aligning the flexure blade orthogonal to the radial expansion and contraction.

The exemplary assemblies of FIGS. 2 and 3 enable movement in one direction by restraining relative motion in other translatory and rotational directions. However, the assemblies could be modified to include secondary washer bearings having flexure alignment orthogonal to the primary washer bearings, with the secondary washer bearing enabling movement in another orthogonal direction.

The flexure washer bearing is an assembly used as a load bearing mechanism for disposition between two mounting plates having relative movement, which may be caused, for example, by thermal cycling. The flexure blades avoid interface friction shear forces. The full strength of the bolt with normal preloads can be maintained to support components on the component plate. The flexure blades are vertically arranged in parallel orthogonal to the alternating unidirectional motion. The flexures can come in a variety of forms, such as a comb configuration or a serpentine configuration with or without top and bottom washer plates. Those skilled in the art can make enhancements, improvements and modifications to the invention. However, those enhancements, improvements and modifications may nonetheless fall within the spirit and scope of the following claims.

What is claimed is:

1. A flexure washer bearing for enabling alternating unidirectional movement of a top plate relative to a bottom plate fastened together by a fastening means extending through the flexure washer bearing for providing a loading force on the top plate relative to the bottom plate, the flexure washer bearing comprising, a plurality of flexures unidirectionally aligned in parallel and aligned orthogonal to the top and bottom plates, the flexures extending vertically between the top plate and the bottom plate supporting the loading force, the flexures being thin for elastic bending back and forth in alternating unidirectional motion parallel to the top and bottom plates, top surface means for connecting together the plurality of flexures and for buttressing the top plate, bottom surface means for connecting together the plurality of flexures and for buttressing the bottom plate, and an aperture extending between the top surface means and bottom surface means for receiving the fastening means, the aperture being larger than the fastening means for providing space around the fastening means for enabling the fastening means to move relative to at least one of the top and bottom plates as the flexures bend back and forth as the top plate alternately and unidirectionally moves back and forth relative to the bottom plate.

2. The flexure washer bearing of claim 1 wherein the plurality of flexures, and top and bottom surface means are corrugated sheet metal.

3. The flexure washer bearing of claim 1 wherein, the flexures are vertically extending blades connected by horizontally extending top and bottom surfaces, the vertically extending blades and top and bottom surfaces form a continuous undulating metal sheet, and the top and bottom surface means are washer plates attached to the horizontally extending top and bottom surfaces of the flexures.

4. The flexure washer bearing of claim 1 wherein each of the top surface means is a top washer plate, and the bottom surface means is a bottom washer plate with the flexures extending between the top and bottom washer plates.

5. A flexure washer assembly for enabling alternating unidirectional movement of a top plate relative to a bottom plate fastened together under a loading force, the flexure washer assembly comprising, a fastening means extending between the top plate and bottom plate for fastening together the top plate and bottom plate, and a flexure washer means comprising:
  a plurality of flexures unidirectionally aligned in parallel and aligned orthogonal to the top and bottom plates, the flexures extending vertically between the top plate and the bottom plate supporting the loading force, the flexures being thin for elastic bending back and forth in an alternating unidirectional motion parallel to the top and bottom plates;
  top surface means for connecting together the plurality of flexures and for buttressing the top plate;
  bottom surface means for connecting together the plurality of flexures and for buttressing the bottom plate;
  and an aperture extending between the top surface means and bottom surface means for receiving the fastening means, the aperture being larger than the fastening means for providing space around the fastening means for enabling the fastening means to move relative to the top and bottom plates as the flexures bend back and forth as the top plate moves relative to the bottom plate.

6. The flexure washer assembly of claim 5 wherein, the fastening means is bolt having a bolt head and a stem, the stem being rigidly fastened to the bottom plate, and the top plate has a bolt hole that is larger than the stem for providing circumferential space around the bolt stem for enabling the bolt to move relative to the top plate as the flexures bend back and forth as the top plate moves relative to the bottom plate.

7. The flexure washer assembly of claim 5 wherein the fastening means is a bolt having a bolt head and a stem, the stem being rigidly fastened to the bottom plate, the top plate has a bolt hole that is larger than the stem for providing circumferential space around the bolt stem for enabling the bolt to move relative to the top plate as the flexures bend back and forth as the top plate moves relative to the bottom plate, the plurality of flexures comprises top flexures and bottom flexures, the top surface means comprises a first top surface and a second top surface, the bottom surface means comprises a first bottom surface and a second bottom surface, the flexure washer means comprises a top flexure washer bearing and a bottom washer bearing, the top flexure washer bearing comprising the top flexures, the first top surface and the first bottom surface, the bottom washer bearing comprising the bottom flexures, the second top surface and the second bottom surface, with the first top surface affixed to the bolt head, with the first bottom surface affixed to the top plate, with the second top surface affixed to the top plate, and with second bottom surface affixed to the bottom plate.

8. The flexure washer assembly of claim 5 wherein, the aperture is a bolt hole, the fastening means is a bolt having a bolt head, a nut, a head rocker washer, a stem rocker washer, and a threaded stem, the stem extending through the bolt hole and secured to the bottom plate using the nut, the rocker washers having curved surfaces for cocking the bolt within the bolt hole extending through the top and bottom plates, the bolt hole being larger than the stem for providing circumferential space around the bolt stem for enabling the bolt to pivot about the head and stem to cock the bolt at an angle in the bolt hole as the flexures bend back and forth as the top plate moves relative to the bottom plate, and the flexure washer means is a flexure washer bearing having the top surface means affixed to the bottom of the top plate and has the bottom surface means affixed to the top of the bottom plate as the flexure bends back and forth during relative movement between the top and bottom plates.

* * * * *